(12) United States Patent
Jang

(10) Patent No.: US 12,545,254 B2
(45) Date of Patent: Feb. 10, 2026

(54) APPARATUS AND METHOD FOR RESPONDING TO CUT-IN OF A VEHICLE

(71) Applicants: HYUNDAI MOTOR COMPANY, Seoul (KR); KIA CORPORATION, Seoul (KR)

(72) Inventor: Yon Jun Jang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 162 days.

(21) Appl. No.: 18/516,073

(22) Filed: Nov. 21, 2023

(65) Prior Publication Data
US 2024/0182028 A1 Jun. 6, 2024

(30) Foreign Application Priority Data

Dec. 6, 2022 (KR) .......................... 10-2022-0168808

(51) Int. Cl.
*B60W 30/14* (2006.01)

(52) U.S. Cl.
CPC ....... *B60W 30/143* (2013.01); *B60W 2552/10* (2020.02); *B60W 2552/53* (2020.02); *B60W 2554/4041* (2020.02); *B60W 2554/4044* (2020.02); *B60W 2554/4045* (2020.02); *B60W 2554/406* (2020.02); *B60W 2555/60* (2020.02);
(Continued)

(58) Field of Classification Search
CPC ....... B60W 30/143; B60W 2554/4041; B60W 2554/4044; B60W 2554/406; B60W 2554/4045; B60W 2552/53; B60W 2552/10; B60W 2555/60; B60W 2754/30; B60W 2720/106; B60W 30/18163; B60W 60/0017; B60W 30/181; B60W 40/04; B60W 40/105; B60W 40/107;
(Continued)

(56) References Cited

U.S. PATENT DOCUMENTS

2017/0154225 A1* 6/2017 Stein .................... G05D 1/0246

FOREIGN PATENT DOCUMENTS

| CN | 110097785 A | * | 8/2019 | ............. G08G 1/167 |
| KR | 20220060505 A | * | 5/2022 | ....... G08G 1/096783 |

OTHER PUBLICATIONS

CN-110097785-A translated (Year: 2019).*
KR-20220060505-A translated (Year: 2022).*

* cited by examiner

*Primary Examiner* — James J Lee
*Assistant Examiner* — Brandon S Lee
(74) *Attorney, Agent, or Firm* — Lempia Summerfield Katz LLC

(57) ABSTRACT

An apparatus for controlling a host vehicle comprises a driving lane recognizer configured to determine whether a driving lane on which the host vehicle is traveling is congested or not, a neighboring vehicle detector configured to obtain vehicle information including a movement and a heading direction of at least one neighboring vehicle traveling on at least one neighboring lane, a lane change intention determiner configured to determine whether the at least one neighboring vehicle has an intention to cut in the driving lane based on the vehicle information, a cut-in allowance determiner configured to determine whether to allow a cut-in of the at least one neighboring vehicle, and a cut-in response controller configured to control the host vehicle to accelerate or decelerate according to a determination of the cut-in allowance determiner.

19 Claims, 14 Drawing Sheets

(52) U.S. Cl.
CPC ... *B60W 2720/106* (2013.01); *B60W 2754/30* (2020.02)

(58) Field of Classification Search
CPC ..... B60W 2420/403; B60W 2520/105; B60W 2554/802
See application file for complete search history.

When a neighboring vehicle attempts to cut in
by passing the host vehicle from a lane with a smooth traffic flow,
it is determined as an unscrupulous driving behavior,
and the cut-in is disallowed.

When a neighboring vehicle attempts to cut in
by passing on a shoulder of a road,
it is determined as a violation of traffic law,
and the cut-in is disallowed.

When a lane change is made by crossing a solid line, which violates a traffic law, the cut-in is disallowed.

In a section where two lanes join,
for alternating positions of the vehicles of both lanes on the driving lane,
a vehicle cutting in ahead of the host vehicle is allowed
and a successive cut-in is disallowed.

In response to a determination to allow a cut-in by a target vehicle, deceleration control is performed on the host vehicle to broaden a gap with the preceding vehicle to be longer than the length of the target vehicle.

In response to a determination to disallow a cut-in by a target vehicle, acceleration control is performed on the host vehicle to narrow a gap with the preceding vehicle to be shorter than the length of the target vehicle.

APPARATUS AND METHOD FOR RESPONDING TO CUT-IN OF A VEHICLE

CROSS-REFERENCE TO RELATED APPLICATION

This application claims the benefit of and priority to Korean Patent Application No. 10-2022-0168808, filed on Dec. 6, 2022, the entire contents of which are incorporated herein by reference.

BACKGROUND

Technical Field

The present disclosure relates to an apparatus and a method of an autonomous vehicle to respond to a cut-in of a neighboring vehicle.

Discussion of the Related Art

In general, at autonomous driving level 3 or higher, an autonomous driving system may control a vehicle ("a host vehicle") to travel to a destination along a set path without intervention by a driver of the vehicle. To this end, the autonomous driving system of the host vehicle may control the host vehicle to maintain a lane or a certain distance from a neighboring vehicle while identifying and determining a surrounding situation of the host vehicle, and the autonomous driving system may control the host vehicle to change the lane or pass a neighboring vehicle (e.g., a vehicle traveling near the host vehicle) if necessary.

In addition, when the neighboring vehicle traveling on a neighboring lane (e.g., a lane adjacent to a lane in which the host vehicle is traveling) changes the lane and cuts in ahead of the host vehicle that is under an autonomous driving control, the autonomous driving system may generally control the host vehicle to decelerate and thus maintain a distance from the neighboring vehicle that is cutting into the lane of the host vehicle and may thereby allow the lane change.

A typical autonomous driving system may allow a lane change to maintain a distance between a subject vehicle (i.e., a host vehicle) and a vehicle that is cutting in ahead of the subject vehicle, as described above. However, the system may allow a neighboring vehicle to cut in without any limitations, which, in turn, could worsen the congestion on the lane where the subject vehicle is traveling.

SUMMARY

Various aspect of the present disclosure are directed to providing a cut-in response apparatus and method of, for example, an autonomous vehicle that determines whether to allow a neighboring vehicle to cut in and responds accordingly by determining a traffic flow based on a situation of a driving lane and neighboring vehicles, thereby preventing congestion from being aggravated due to an indiscriminate allowance of lane changes.

According to an embodiment of the present disclosure, an apparatus for controlling a host vehicle comprises a driving lane recognizer configured to determine whether a driving lane on which the host vehicle is traveling is congested or not, and a neighboring vehicle detector configured to obtain vehicle information including a movement and a heading direction of at least one neighboring vehicle traveling on at least one neighboring lane, by using at least one of a sensor or a camera provided in the host vehicle. The apparatus further includes: a lane change intention determiner configured to determine whether the at least one neighboring vehicle has an intention to cut in the driving lane based on the vehicle information, a cut-in allowance determiner configured to determine whether to allow a cut-in of the at least one neighboring vehicle, and a cut-in response controller configured to control the host vehicle to accelerate or decelerate according to a determination of the cut-in allowance determiner.

In at least one embodiment of the present disclosure, the lane change intention determiner is further configured to determine a target vehicle among the at least one neighboring vehicle based on positions of the at least one neighboring vehicle, and determine whether the target vehicle has an intention to cut in the driving lane based on a position change and a heading direction of the target vehicle.

In at least one embodiment of the present disclosure, the lane change intention determiner is further configured to determine whether the target vehicle has the intention when at least one tire of the target vehicle steps on or crosses a line of the driving lane while a lateral distance d between the line and the target vehicle becomes gradually shorter and the heading direction of the target vehicle being inclines toward the line.

In at least one embodiment of the present disclosure, the cut-in allowance determiner is further configured to determine to disallow a cut-in of the at least one neighboring vehicle when deceleration or stop control for the host vehicle occurs in a preset number of times due to one or more other vehicle cutting in ahead of a preceding vehicle traveling in front of the host vehicle.

In at least one embodiment of the present disclosure, the cut-in allowance determiner is further configured to determine to disallow a cut-in of the at least one neighboring vehicle when the at least one neighboring vehicle fails to cut in due to a preceding vehicle traveling in front of the host vehicle in a preset number of times.

In at least one embodiment of the present disclosure, the cut-in allowance determiner is further configured to determine to disallow a cut-in of the at least one neighboring vehicle when a traffic flow of the at least one neighboring lane is smoother than that of the driving lane.

In at least one embodiment of the present disclosure, the cut-in allowance determiner is further configured to determine to disallow a cut-in of the at least one neighboring vehicle when it is determined that the cut-in violates a traffic law.

In at least one embodiment of the present disclosure, the cut-in allowance determiner is further configured to determine to allow a cut-in of the at least one neighboring vehicle when the at least one neighboring lane joins the driving lane, and determine to disallow a subsequent cut-in of another neighboring vehicle.

In at least one embodiment of the present disclosure, the cut-in response controller is further configured to control the host vehicle to decelerate to increase a gap with a preceding vehicle to provide a space for the cut-in in response to a determination of allowing the cut-in.

In at least one embodiment of the present disclosure, the cut-in response controller is further configured to control the host vehicle to accelerate to decrease a gap with a preceding vehicle not to provide a space for the cut-in in response to a determination of disallowing the cut-in.

According to another embodiment of the present disclosure, a method of controlling a host vehicle comprises a driving vehicle recognizing step of determining whether a driving lane on which the host vehicle is traveling is congested or not. The method further includes: a neighboring vehicle detecting step obtaining vehicle information including a movement and a heading direction of at least one neighboring vehicle traveling on at least one neighboring lane, by use of at least one of a sensor or a camera provided in the host vehicle; and a lane change intention determining step of determining whether the at least one neighboring vehicle has an intention to cut in the driving lane based on the vehicle information. The method further includes a cut-in allowance determining step of determining whether to allow a cut-in of the at least one neighboring vehicle, and a cut-in response controlling step of controlling the host vehicle to accelerate or decelerate according to a determination of the cut-in allowance determiner.

In at least one embodiment of the method, the lane change intention determining step comprises determining a target vehicle among the at least one neighboring vehicle based on positions of the at least one neighboring vehicle, and determining whether the target vehicle has an intention to cut in the driving lane based on a position change and a heading direction of the target vehicle.

In at least one embodiment of the method, the lane change intention determining step comprises determining whether the target vehicle has the intention when at least one tire of the target vehicle steps on or crosses a line of the driving lane while a lateral distance "d" between the line and the target vehicle becoming gradually shorter and the heading direction of the target vehicle being inclined toward the line.

In at least one embodiment of the method, the cut-in allowance determining step comprises determining to disallow a cut-in of the at least one neighboring vehicle when deceleration or stop control for the host vehicle occurs in a preset number of times due to one or more other vehicle cutting in ahead of a preceding vehicle traveling in front of the host vehicle.

In at least one embodiment of the method, the cut-in allowance determining step comprises determining to disallow a cut-in of the at least one neighboring vehicle when the at least one neighboring vehicle fails to cut in due to a preceding vehicle traveling in front of the host vehicle in a preset number of times.

In at least one embodiment of the method, the cut-in allowance determining step comprises determining to disallow a cut-in of the at least one neighboring vehicle when a traffic flow of the at least one neighboring lane is smoother than that of the driving lane.

In at least one embodiment of the method, the cut-in allowance determining step comprises determining to disallow a cut-in of the at least one neighboring vehicle when it is determined that the cut-in violates a traffic law.

In at least one embodiment of the method, the cut-in allowance determining step comprises determining to allow a cut-in of the at least one neighboring vehicle when the at least one neighboring lane joins the driving lane, and determining to disallow a subsequent cut-in of another neighboring vehicle.

In at least one embodiment of the method, the cut-in response controlling step comprises controlling the host vehicle to decelerate to increase a gap with a preceding vehicle to provide a space for the cut-in in response to a determination of allowing the cut-in.

In at least one embodiment of the method, the cut-in response controlling step comprises controlling the host vehicle to accelerate to decrease a gap with a preceding vehicle not to provide a space for the cut-in in response to a determination of disallowing the cut-in.

A non-transitory computer-readable storage medium, according to an embodiment of the present disclosure, stores computer-readable instructions to cause a computer processor to perform at least one method described above.

According to various embodiments of the present disclosure as described above, an autonomous driving system of a vehicle may determine whether to allow a neighboring vehicle to change a lane (e.g., cut in) by identifying a traffic flow based on a situation of a driving lane and neighboring vehicles and may control the vehicle to respond accordingly, thereby preventing traffic congestion from being aggravated due to an indiscriminate allowance of lane changes.

Additional advantages, objects, and features of the present disclosure are set forth in part in the description which follows and in part become apparent to those having ordinary skill in the art upon examination of the following or may be learned from practice of the disclosure. The objects and other advantages of the disclosure may be realized and attained by the structure particularly pointed out in the written description and claims hereof as well as the appended drawings.

DETAILED DESCRIPTION OF THE DISCLOSURE

Figure 1:
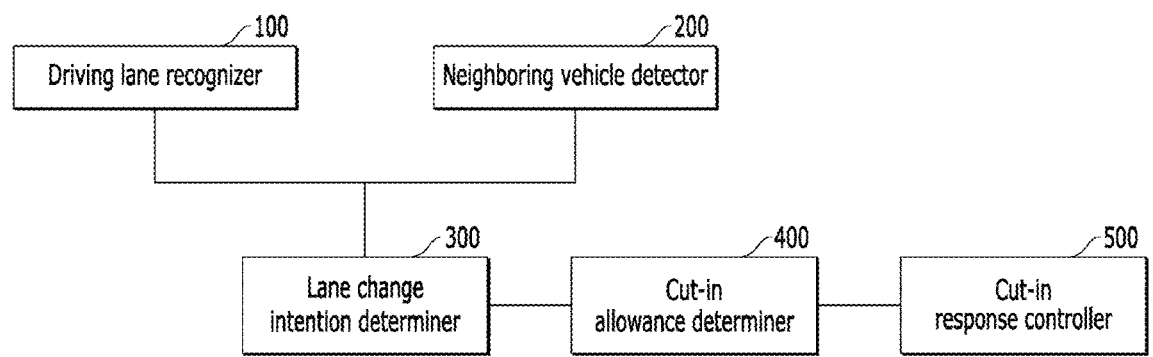
FIG. 1 is a block diagram illustrating a cut-in response apparatus of an autonomous vehicle according to an embodiment of the present disclosure.

Hereinafter, embodiments of the present disclosure are described in detail with reference to the accompanying drawings, and the same or similar elements are given the same reference numerals regardless of reference symbols, and redundant description thereof has been omitted. In the following description, the terms "module," "unit," and/or "-er/or" for referring to elements are assigned and used interchangeably in consideration of the convenience of description, and thus the terms per se do not necessarily have different meanings or functions. Further, in describing the embodiments of the present disclosure, when it is determined that a detailed description of related publicly known technology may obscure the gist of the embodiments described herein, the detailed description thereof has been omitted. The accompanying drawings are used to illustrate various technical features, and it should be understood that the embodiments presented herein are not limited by the accompanying drawings. As such, the present disclosure should be construed to extend to any alterations, equivalents, and substitutes, in addition to those that are particularly set out in the accompanying drawings.

Although terms including ordinal numbers, such as "first," "second," and the like, may be used herein to describe various elements, the elements are not limited by these terms. These terms are only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

When a component, device, element, or the like of the present disclosure is described as having a purpose or performing an operation, function, or the like, the component, device, or element should be considered herein as being "configured to" meet that purpose or to perform that operation or function.

In addition, the term "unit" or "control unit" included in the names of a hybrid control unit (HCU), a motor control unit (MCU), and the like is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, etc., and one or more processors that perform determination, calculation, decision, etc. necessary for controlling a function assigned thereto.

Hereinafter, embodiments of the present disclosure are described in detail with reference to FIGS. 1 to 11.

FIG. 1 is a block diagram illustrating a cut-in response apparatus of an autonomous vehicle according to an embodiment of the present disclosure.

Referring to FIG. 1, according to an embodiment of the present disclosure, a cut-in response apparatus of an autonomous vehicle (i.e., a host vehicle) may include: a driving lane recognizer 100 configured to determine whether a driving lane on which the vehicle is traveling is congested or not, based on information recognized by a camera provided in the vehicle that is autonomously traveling. The apparatus further includes a neighboring vehicle detector 200 configured to obtain vehicle information including movements and heading directions of neighboring vehicles traveling on neighboring lanes, using a sensor and the camera provided in the vehicle; and a lane change intention determiner 300 configured to determine whether a neighboring vehicle has an intention to change a lane toward (or cut in on) the driving lane based on the vehicle information of the neighboring vehicles. The apparatus further includes a cut-in allowance determiner 400 configured to determine whether to allow a lane change for a neighboring vehicle specified as having the intention to change the lane, using situation information of surroundings of the vehicle and lane information obtained using the sensor and the camera; and a cut-in response controller 500 configured to control the vehicle to accelerate or decelerate in response to a determination of whether to allow the lane change.

The present disclosure is provided to control a response in a situation in which a neighboring vehicle cuts in on a driving lane, at autonomous driving level 3 or higher at which an autonomous driving system performs a lane change (e.g., a cut-in) while accelerating or decelerating or steering by identifying a situation around the vehicle that is traveling.

Accordingly, the driving lane recognizer 100, the neighboring vehicle detector 200, the lane change intention determiner 300, the cut-in allowance determiner 400, and the cut-in response controller 500 may be programmed in the form of software and provided in a control device of the autonomous driving system provided in the vehicle, or provided in the form of hardware such as a module.

The driving lane recognizer 100 may determine whether the driving lane is in a general driving situation in which smooth driving is available (e.g., no traffic situation) or in a congested driving situation in which the speed of the vehicle is limited to a certain speed or less, based on the lane recognition information recognized by the camera and the speed of the vehicle.

In this case, the driving lane recognizer 100 may recognize the driving lane on which the vehicle is traveling, using a precise map provided for autonomous driving and position information of the vehicle obtained by a positioning device such as a global positioning system (GPS).

Figure 2:
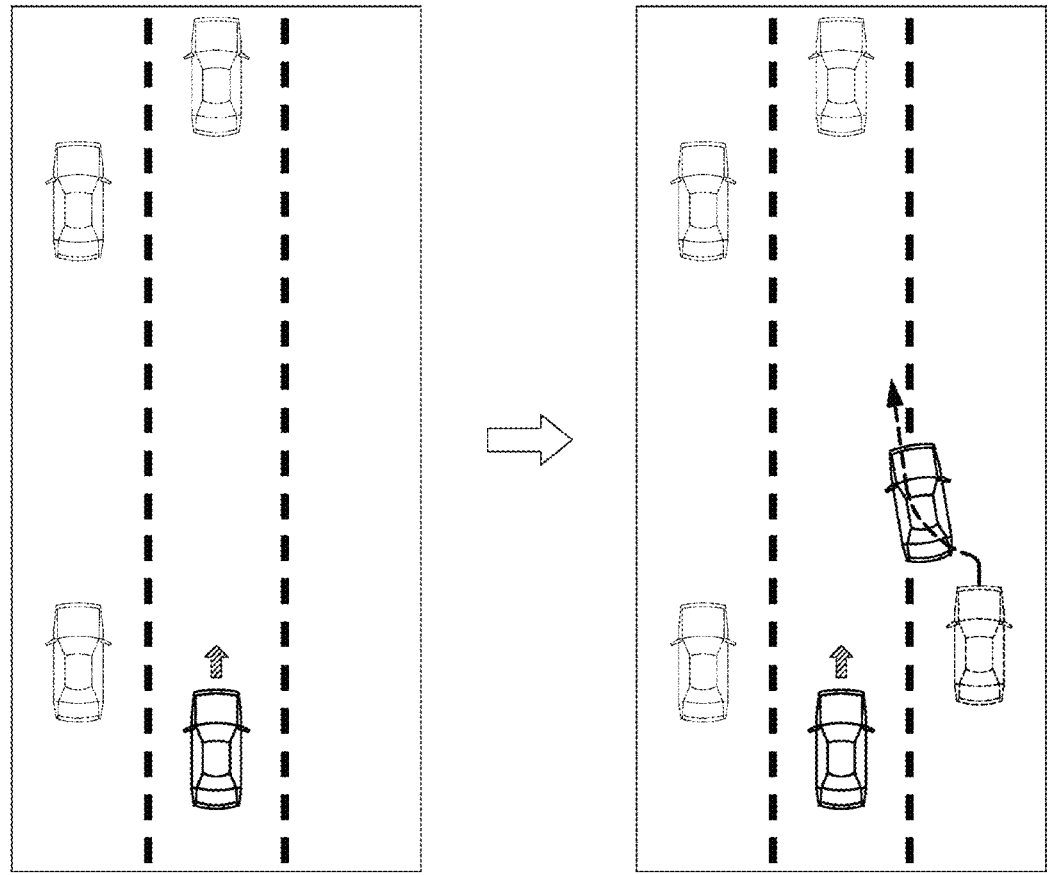
FIG. 2 is a diagram illustrating an example of a cut-in occurring in a smooth lane situation according to an embodiment of the present disclosure.

As shown in FIG. 2, in response to a determination that a distance to preceding and following vehicles that are traveling ahead and behind is large and that smooth driving at the specified speed is available, the driving lane recognizer 100 may determine the driving lane as being in a general driving situation with no congestion on the driving lane.

Figure 3:
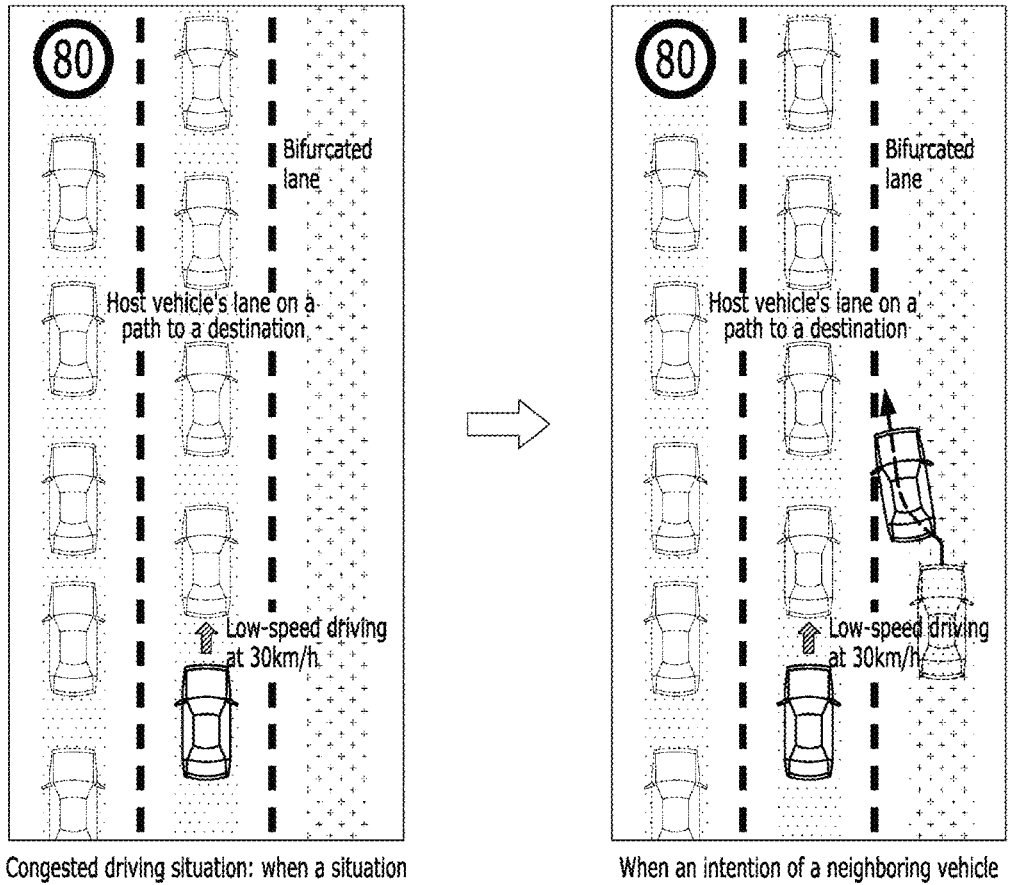
FIG. 3 is a diagram illustrating an example of a cut-in occurring in a congested lane situation according to an embodiment of the present disclosure.

In addition, as shown in FIG. 3, in response to a determination that the distance to the preceding and following vehicles is small and a situation in which the speed of the vehicle traveling on the driving lane is less than 50% of a limited speed is continued for a predetermined period of time, the driving lane recognizer 100 may determine the driving lane as being in a congested driving situation.

In addition, the neighboring vehicle detector 200 may detect movements of neighboring vehicles traveling on other lanes around the driving lane, using the vehicle information of the neighboring vehicles obtained by the camera and the sensor (e.g., radar, lidar, etc.) that are provided in the vehicle.

In this case, the neighboring vehicle detector 200 may obtain, as the vehicle information of the neighboring vehicles, a position, a size (i.e., a size including a length and a width of a vehicle), a movement (i.e., whether a vehicle is in motion or at rest), a speed (including longitudinal and lateral velocities), acceleration (including longitudinal and lateral acceleration), a heading direction (i.e., a heading angle toward which a vehicle is heading), and the like.

In addition, the lane change intention determiner 300 may specify a target vehicle attempting to change a lane to be in front of the vehicle based on positions of the neighboring vehicles, and determine whether the target vehicle has an intention to change the lane toward the driving lane based on a position change and a heading direction of the specified target vehicle.

To this end, the lane change intention determiner 300 may determine a lateral distance "d" between a line on one side of the driving lane and a center of the target vehicle, a heading angle of the target vehicle, and a position of a tire of the target vehicle, and may determine whether the target vehicle has the intention to change the lane by cutting in ahead of the vehicle.

Figure 4:
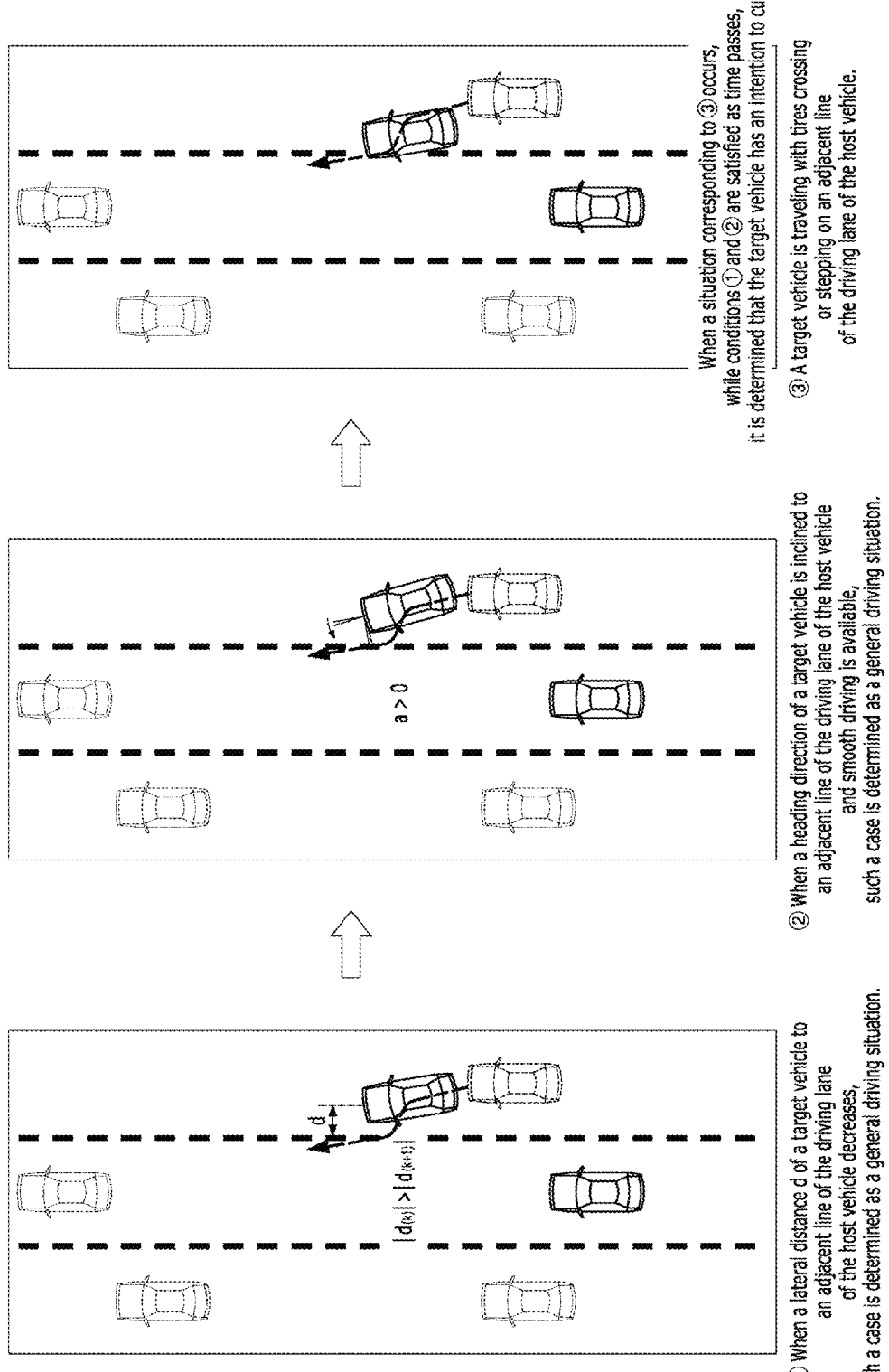
FIG. 4 is a diagram illustrating an example of determining a lane change intention of a target vehicle according to an embodiment of the present disclosure.

Accordingly, as shown in FIG. 4, in response to a determination that, as the lateral distance "d" between the line on one side of the driving lane and the center of the target vehicle becomes gradually shorter (represented as $|d_{(k)}|>|d_{(k+1)}|$ in FIG. 4) and the heading direction of the target vehicle is inclined toward the line on one side of the driving lane (represented as a >0 in FIG. 4), the target vehicle is traveling with the position of the tire of the target vehicle crossing or stepping on the line on one side of the driving lane, the lane change intention determiner 300 may determine that the target vehicle has the intention to change the lane. In other words, the lane change intention determiner 300 assesses whether the target vehicle intends to change lanes by monitoring if at least one tire of the vehicle steps on or crosses the line of the driving lane, while the lateral distance between the line and the target vehicle decreases, and the heading direction of the target vehicle inclines toward the line.

In addition, the cut-in allowance determiner 400 may determine whether to allow a forward lane change made in front of the vehicle for the neighboring vehicle that is determined to have the intention to change the lane by the lane change intention determiner 300, based on the situation information of the surroundings of the vehicle and the lane information. In this case, the lane change may also be referred to herein as "cut-in," and thus the terms "lane change" or "change a lane" may be used interchangeably with "cut-in" or "cut in on a lane."

Figure 5:
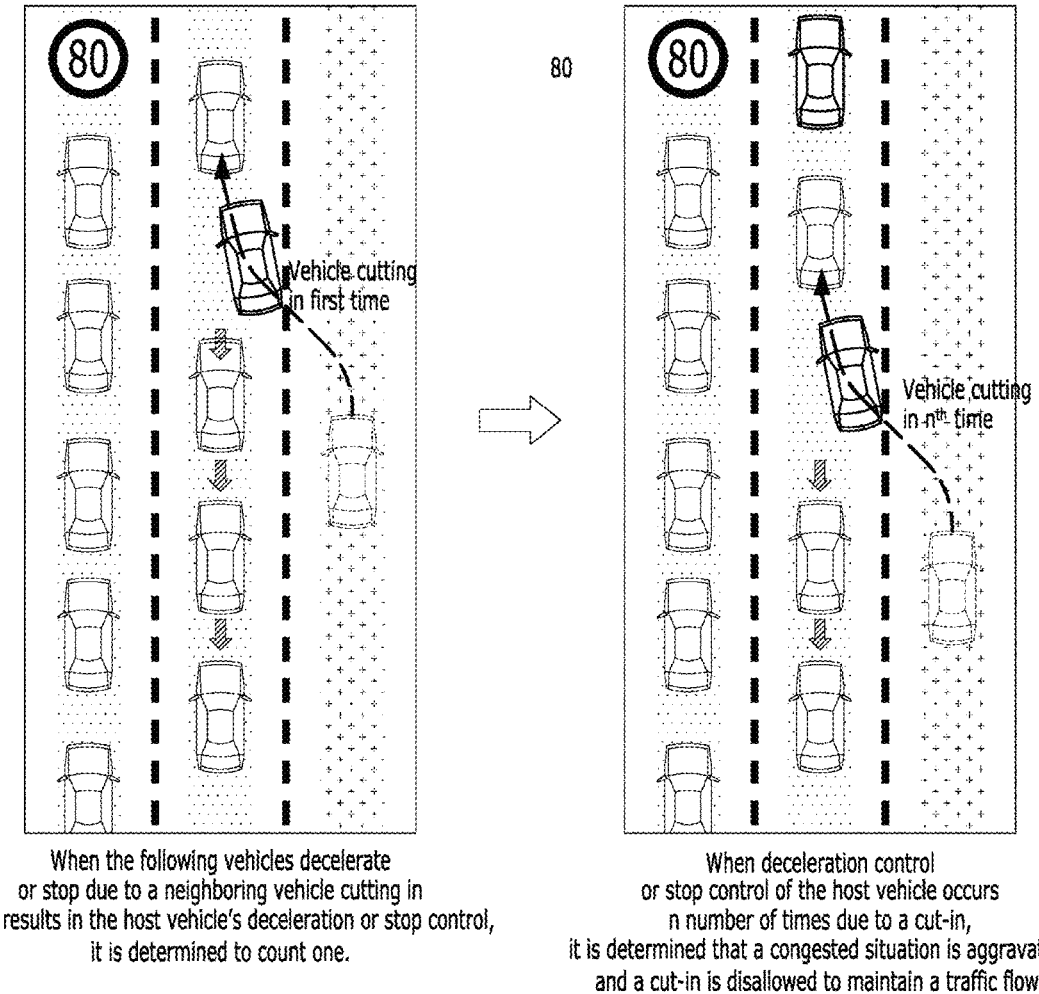
FIG. 5 is a diagram illustrating a situation where allowing a cut-in aggravates congestion according to an embodiment of the present disclosure.

As shown in FIG. 5, when deceleration control or stop control for the vehicle occurs a preset number of times (e.g., n times) or more due to a neighboring vehicle cutting in ahead of a preceding vehicle that is traveling in front of the vehicle, the cut-in allowance determiner 400 may determine that allowing such a lane change aggravates congestion of the driving lane and may thus determine to disallow a forward lane change (i.e., cut-in) made in front of the vehicle.

In this case, the cut-in allowance determiner 400 may count one deceleration control in a case in which a neighboring vehicle cutting in ahead of the preceding vehicle is detected, vehicles following the preceding vehicle decelerate or stop due to the cut-in by the neighboring vehicle, and as a result, the vehicle is also controlled to decelerate or stop.

In addition, as shown in FIG. 5, in a case in which cutting in ahead of the preceding vehicle is repeated a plurality of times, the cut-in allowance determiner 400 may determine whether the number of times of deceleration control or stop control for the vehicle caused therefrom exceeds a preset number of times to determine whether to allow the lane change.

In addition, when there is a neighboring vehicle having an intention to change a lane to be in front of the vehicle, in a state where the deceleration control or the stop control for the vehicle occurs due to the neighboring vehicle less than a preset number of times, the cut-in allowance determiner 400 may determine to allow the lane change.

Figure 6:
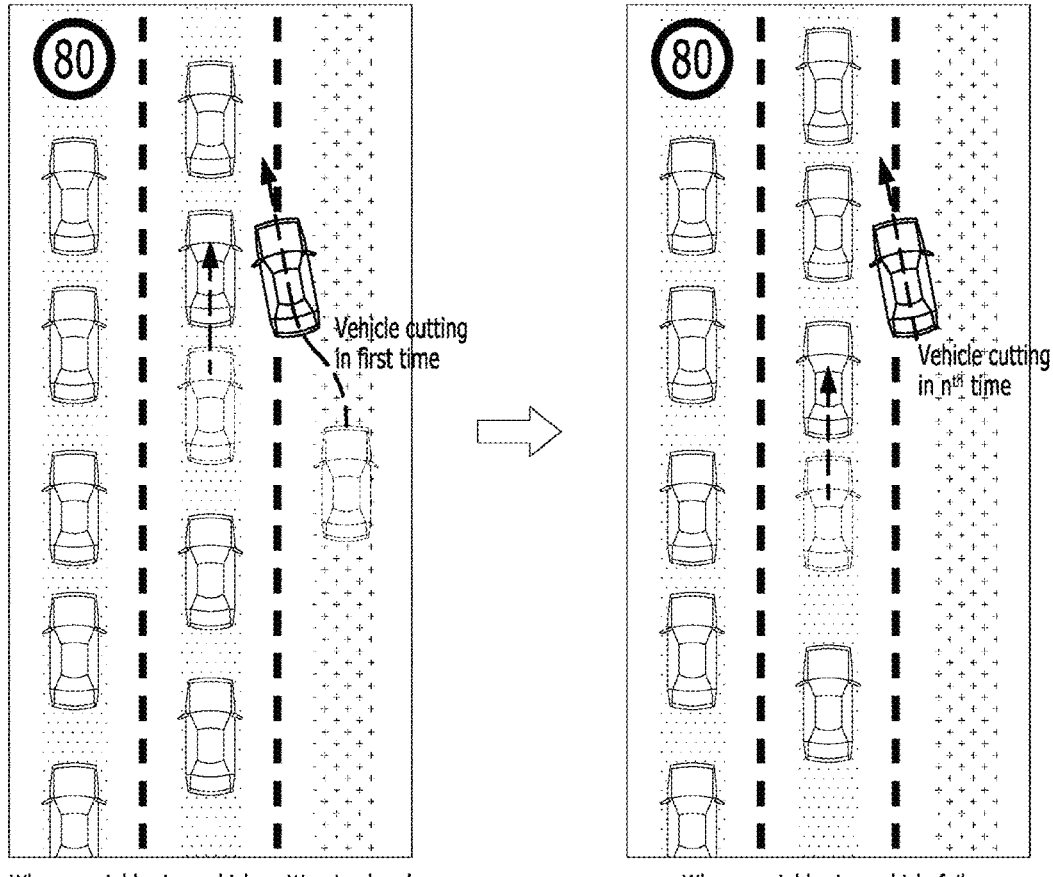
FIG. 6 is a diagram illustrating a situation where a neighboring vehicle fails to cut in a number of times and thus a traffic flow is determined to be impeded when the cut-in is allowed, according to an embodiment of the present disclosure.

In addition, as shown in FIG. 6, when the same neighboring vehicle fails to cut in for a number of times greater than or equal to a preset number of times (e.g., n times) due to the preceding vehicle traveling in front of the vehicle is, the cut-in allowance determiner 400 may determine to disallow a forward lane change (i.e., cut-in) in front of the vehicle to maintain a traffic flow on the driving lane.

In this case, the cut-in allowance determiner 400 may count as "one cut-in failure" when, after detecting a neighboring vehicle attempting to cut in ahead of the preceding vehicle, the preceding vehicle increases the speed to narrow a gap with a vehicle traveling in front of the preceding vehicle, and the neighboring vehicle finally fails to cut in.

Figure 7:
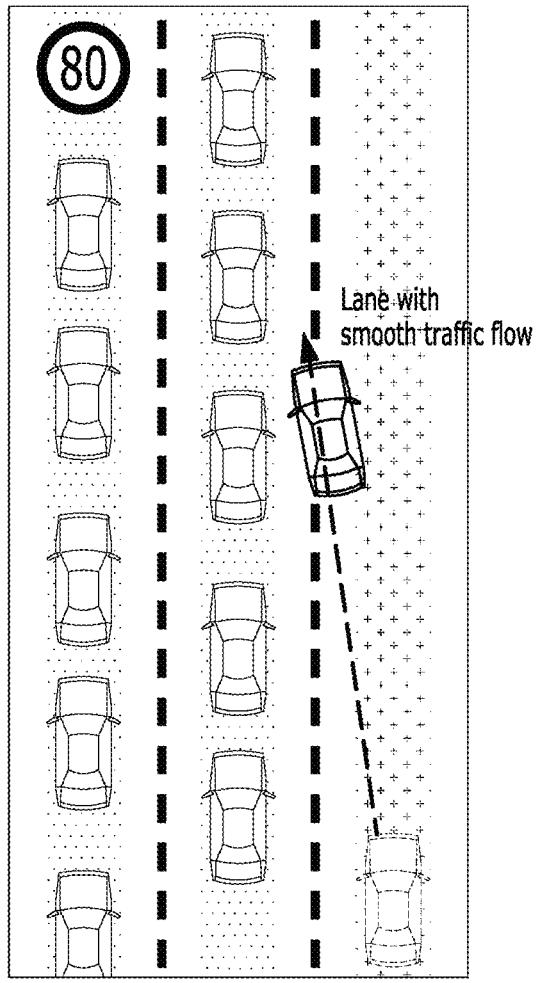
FIG. 7 is a diagram illustrating an example case in which a cut-in of a neighboring vehicle is disallowed when an unscrupulous driving behavior of the neighboring vehicle is determined according to an embodiment of the present disclosure.

In addition, as shown in FIG. 7, in a smooth traffic flow situation, when it is determined that a neighboring vehicle has approached from behind the vehicle from a neighboring lane and has passed the vehicle, and when the neighboring vehicle is attempting to cut in ahead of the vehicle, the cut-in allowance determiner 400 may consider it an unscrupulous driving behavior of the neighboring vehicle and determine to disallow a forward lane change (i.e., cut-in) in front of the vehicle.

Figure 8A:
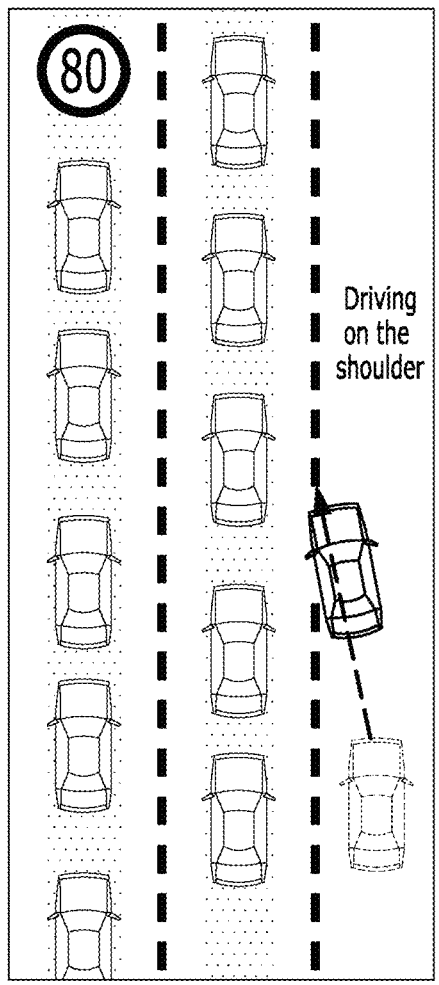
FIGS. 8A and 8B are diagrams illustrating example cases in which cut-in attempts are determined as a violation of a traffic law and thus the cut-in is disallowed according to an embodiment of the present disclosure.
Figure 8B:
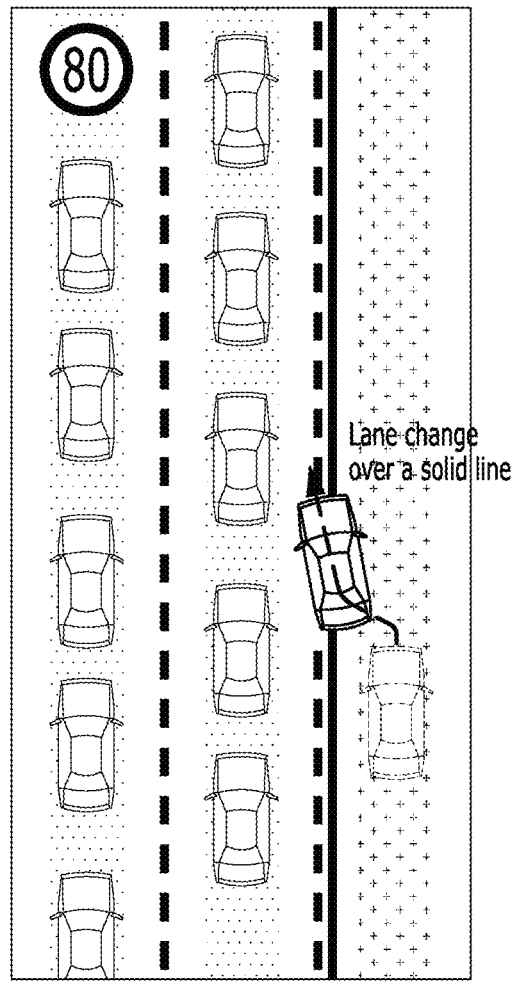

In addition, as shown in FIGS. 8A and 8B, when cutting in ahead of the vehicle is determined to be a violation of a traffic law, the cut-in allowance determiner 400 may determine to disallow a forward lane change (i.e., cut-in) in front of the vehicle to prevent such a violation.

FIG. 8A illustrates an example case in which a neighboring vehicle traveling on a shoulder where driving is not allowed attempts to cut in ahead of the vehicle to avoid a surveillance camera, and FIG. 8B illustrates an example case in which a neighboring vehicle crosses a solid line and attempts to cut in ahead of the vehicle.

Figure 9:
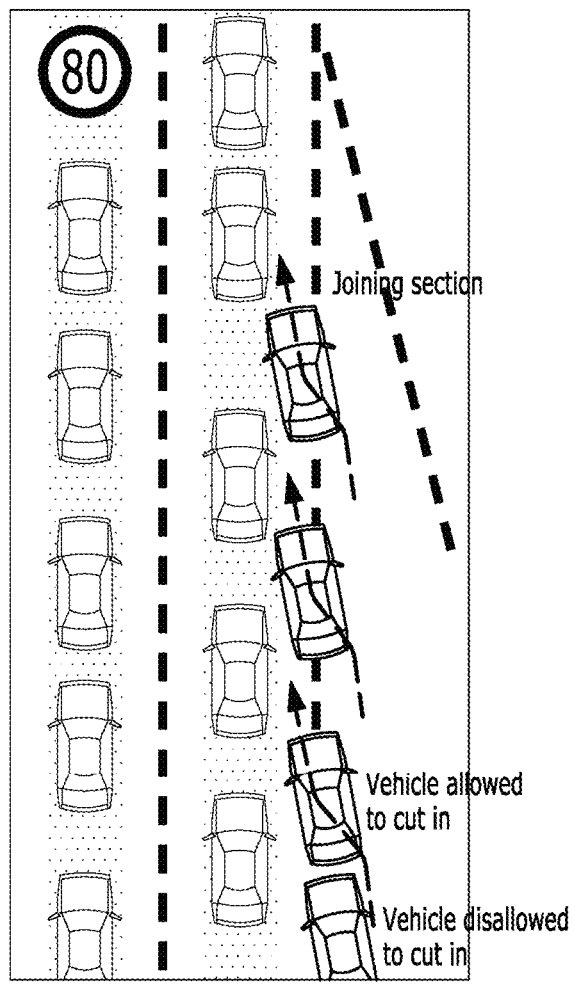
FIG. 9 is a diagram illustrating an example of determining whether to allow a cut-in in a merging section according to an embodiment of the present disclosure.

In addition, as shown in FIG. 9, in a section where lanes join, the cut-in allowance determiner 400 may determine to allow a neighboring vehicle attempting to cut in ahead of the vehicle to change a lane, such that the lane change occurs sequentially between the neighboring vehicle entering in a direction of the driving lane and the vehicle traveling on the driving lane.

In this case, even in a section where the lanes join, successive cut-ins made in front of the vehicle may cause congestion of following vehicles traveling behind the vehicle on the driving lane, and thus the cut-in allowance determiner 400 may disallow the lane change for a successive cut-in attempt by a subsequent neighboring vehicle after the lane change is allowed for one neighboring vehicle.

In this way, the cut-in allowance determiner 400 may identify various cut-in situations using the situation information and the lane information obtained by the sensor and the camera and may then determine whether to allow a forward cut-in made in front of the vehicle within a range that does not impede a traffic flow.

Figure 10:
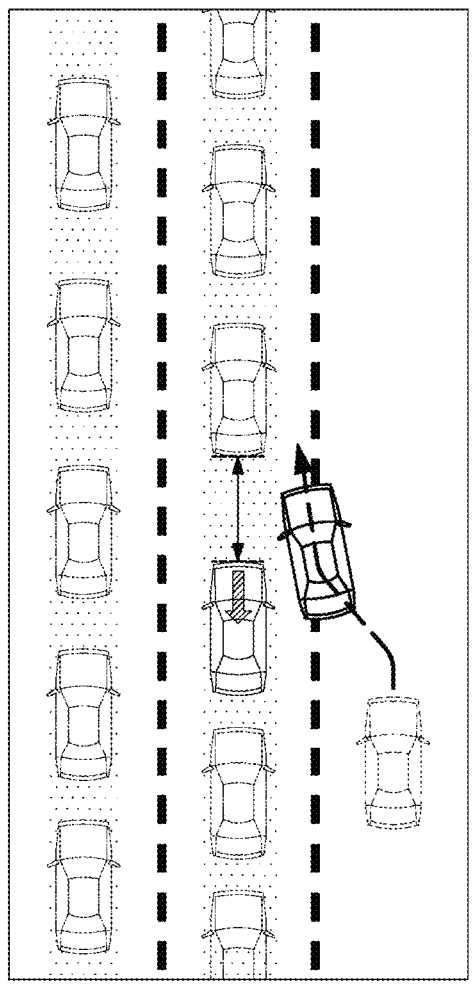
FIG. 10 is a diagram illustrating a deceleration control to increase a gap with a preceding vehicle when a cut-in is allowed according to an embodiment of the present disclosure.

In addition, when the cut-in allowance determiner 400 determines to allow a lane change (i.e., a cut-in) in front of the vehicle, the cut-in response controller 500 may perform deceleration control on the vehicle to widen a gap with a preceding vehicle in order to provide a space for a neighboring vehicle to cut in, as shown in FIG. 10.

In this case, the cut-in response controller 500 may perform the deceleration control to induce a stable lane change of the neighboring vehicle and maintain a state in which the gap with the preceding vehicle remains longer than the length of the neighboring vehicle in consideration of a gap between the vehicles after the neighboring vehicle cuts in.

Figure 11:
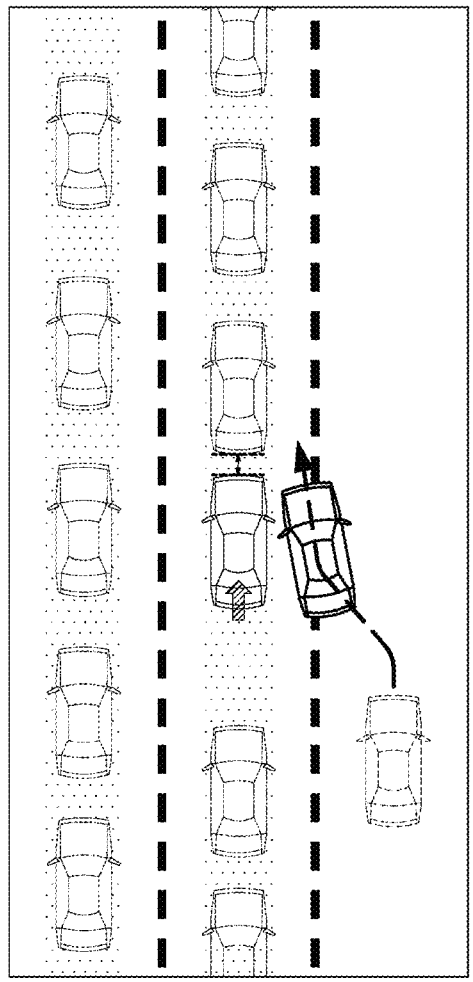
FIG. 11 is a diagram illustrating an acceleration control to decrease a gap with a preceding vehicle when a cut-in is disallowed according to an embodiment of the present disclosure.

In addition, when the cut-in allowance determiner 400 determines to disallow a lane change (i.e., a cut-in) in front of the vehicle, the cut-in response controller 500 may perform acceleration control on the vehicle to narrow the gap with the preceding vehicle in order not to provide a space for the neighboring vehicle to cut in, as shown in FIG. 11.

In this case, the cut-in response controller 500 may control the vehicle to accelerate or decelerate such that the gap between the vehicle and the neighboring vehicle remains shorter than the length of the neighboring vehicle until the lane change intention of the neighboring vehicle disappears.

Hereinafter, a cut-in response method of an autonomous vehicle according to another embodiment of the present disclosure is described with reference to FIGS. 12 and 13.

Figure 12:
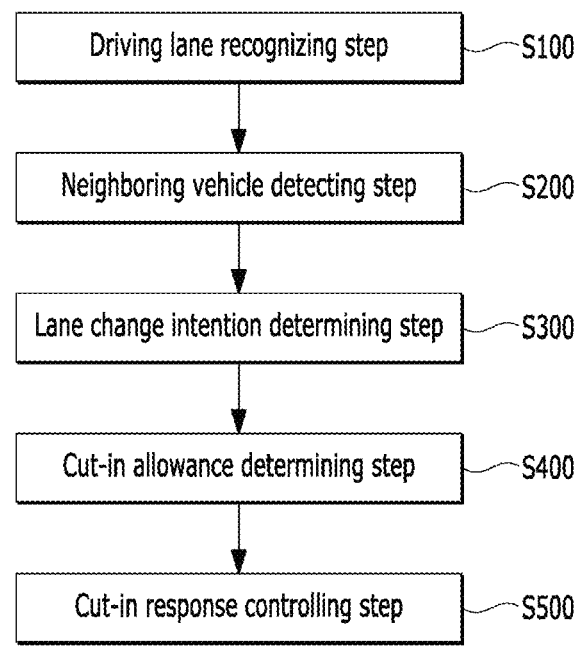
FIG. 12 a diagram illustrating a cut-in response method of an autonomous vehicle according to another embodiment of the present disclosure.
Figure 13:
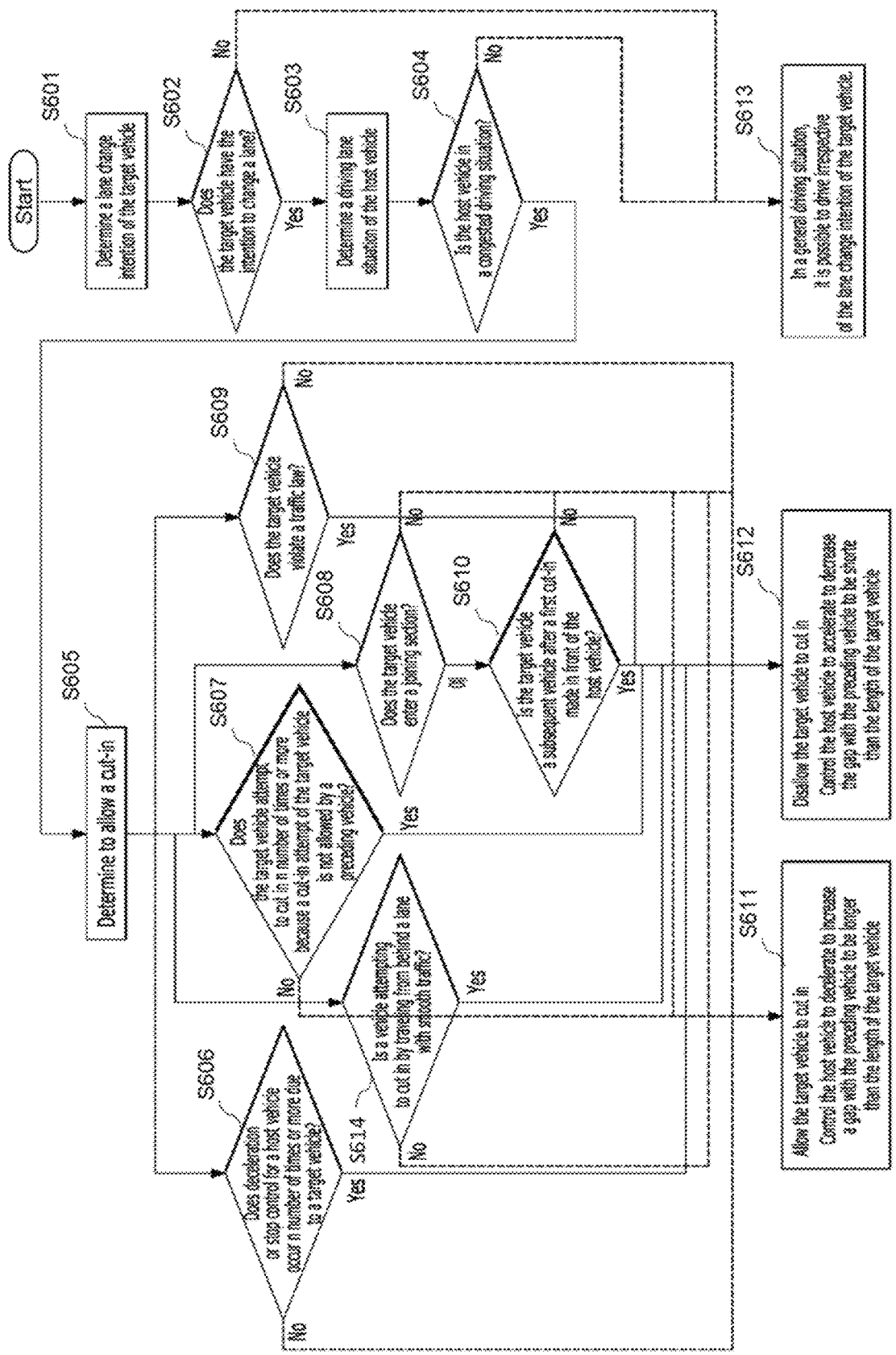
FIG. 13 is a flowchart illustrating operating steps for executing a cut-in response control in an autonomous driving system according to another embodiment of the present disclosure.

FIG. 12 a diagram illustrating a cut-in response method of an autonomous vehicle according to another embodiment of the present disclosure, and FIG. 13 is a flowchart illustrating operating steps for executing cut-in response control in an autonomous driving system according to another embodiment of the present disclosure.

Referring to FIGS. 12 and 13, a cut-in response method of an autonomous vehicle according to another embodiment of the present disclosure may include a driving lane recognizing step S100 in which an autonomous driving system determines whether a driving lane on which the vehicle is traveling is congested, based on information recognized by a camera provided in the vehicle that is autonomously driving. The method further includes a neighboring vehicle detecting step S200 in which the autonomous driving system obtains vehicle information including movements and heading directions of neighboring vehicles traveling on neighboring lanes (i.e., lanes next to a driving lane on which the vehicle is traveling) using a sensor and the camera provided in the vehicle. The method further includes a lane change intention determining step S300 in which the autonomous driving system determines whether a neighboring vehicle has an intention to change a lane toward the driving lane based on the vehicle information of the neighboring vehicles. The method also includes a cut-in allowance determining step S400 in which the autonomous driving system determines whether to allow a lane change for the neighboring vehicle specified as having the intention to change the lane, using situation information of surroundings of the vehicle and lane information obtained using the sensor and the camera. The method includes a cut-in response controlling step S500 that controls the vehicle to accelerate or decelerate in response to a determination of whether to allow the lane change (i.e., a cut-in) of the neighboring vehicle.

The driving lane recognizing step S100 may determine whether the driving lane is in a general driving situation in which smooth driving is available (e.g., no traffic situation) or in a congested driving situation (e.g., traffic situation) in which the speed of the vehicle is limited to a preset speed or less, based on lane recognition information recognized by the camera and the speed of the vehicle.

In addition, the neighboring vehicle detecting step S200 may detect movements of neighboring vehicles traveling on other lanes around the driving vehicle, using the vehicle information of the neighboring vehicles obtained from the camera and the sensor (e.g., radar, lidar, etc.) provided in the vehicle.

In this case, the neighboring vehicle detecting step S200 may obtain, as the vehicle information of the neighboring vehicles, a position, a size (i.e., including a length and a width of a vehicle), a movement (i.e., whether a vehicle is in motion or at rest), a speed (including longitudinal and lateral velocities), acceleration (including longitudinal and lateral acceleration), a heading direction (e.g., a heading angle toward which a vehicle is heading), and the like.

In addition, the lane change intention determining steps (S300, S601) may specify a target vehicle attempting to change a lane to be in front of the vehicle based on positions of the neighboring vehicles, and determine whether the target vehicle has an intention to change the lane toward the driving lane based on a position change and a heading direction of the specified target vehicle (S602).

To this end, the lane change intention determining step S300 may determine a lateral distance "d" between a line on one side of the driving lane and a center of the target vehicle, a heading angle of the target vehicle, and a position of a tire of the target vehicle, and may thereby determine whether the target vehicle has the intention to change the lane by cutting in ahead of the vehicle.

Accordingly, in response to a determination that, as the lateral distance d between the line on one side of the driving lane and the center of the target vehicle becomes gradually shorter (represented as $|d_{(k)}|>|d_{(k+1)}|$ in FIG. 4) and the heading direction of the target vehicle is inclined toward the line on one side of the driving lane (represented as a >0 in FIG. 4), the target vehicle is traveling with the position of the tire crossing or stepping on the line, the lane change intention determining step S300 may determine that the target vehicle has the intention to change the lane (S602).

When it is determined as 'yes' in step S602, step S603 is performed to determine a driving lane situation of the host vehicle, otherwise step S613 is performed. And then, step S604 is performed to determine whether the host vehicle is in a congested driving situation.

In addition, the cut-in allowance determining steps) S400, S605) may determine whether to allow a neighboring vehicle that is determined to have the intention to change a lane to cut in ahead of the vehicle, based on the situation information of the surroundings of the vehicle and the lane information.

When deceleration control or stop control for the vehicle occurs a preset number of times (e.g., n times) or more due to a neighboring vehicle cutting in ahead of a preceding vehicle traveling in front of the vehicle (Yes in step S606), the cut-in allowance determining step S400 may determine that allowing such a lane change (i.e., a cut-in) aggravates congestion of the driving lane and may thus disallow a forward lane change (i.e., a cut-in) in front of the vehicle (S612).

Also, the cut-in allowance determining step S400 may count one deceleration control in a case in which a neighboring vehicle cutting in ahead of a preceding vehicle is detected, vehicles following the preceding vehicle decelerate or stop due to the cut-in by the neighboring vehicle, and as a result, the vehicle is also controlled to decelerate or stop.

In addition, when the number of times the same neighboring vehicle fails to cut in due to a preceding vehicle traveling in front of the vehicle is greater than or equal to a preset number of times (e.g., n times) (S607), the cut-in allowance determining step S400 may determine to disallow a forward lane change made in front of the vehicle in order to maintain a traffic flow of the driving lane (S612).

Further, the cut-in allowance determining step S400 may count as "one cut-in failure" when, after detecting a neighboring vehicle attempting to cut in ahead of the preceding vehicle, the preceding vehicle increases the speed to narrow a gap with a vehicle in front of the preceding vehicle, and the neighboring vehicle finally fails to cut in.

When it is determined that a neighboring vehicle in a no traffic situation (e.g., with a smooth traffic flow) has approached from behind the vehicle from a neighboring lane and has passed the vehicle and then attempts to cut in ahead of the vehicle (S614), the cut-in allowance determining step S400 may consider it an unscrupulous driving behavior of the neighboring vehicle and determine to disallow a forward lane change made in front of the vehicle (S612).

In addition, when cutting in ahead of the vehicle is determined to be a violation of a traffic law (S609), the cut-in allowance determining step S400 may determine to disallow a forward lane change made in front of the vehicle in order to prevent cooperation with such a violation (S612).

In this case, examples of the cut-in that is determined as a violation of the traffic law may include an example case in which a neighboring vehicle traveling on a shoulder where driving is not allowed attempts to cut in ahead of the vehicle to avoid a surveillance camera, and an example case in which a neighboring vehicle crosses a solid line and attempts to cut in ahead of the vehicle.

In addition, in a section where lanes join (S608), the cut-in allowance determining step S400 may determine to allow a neighboring vehicle attempting to cut in ahead of the vehicle to change a lane (S611), such that the lane change occurs sequentially between a neighboring vehicle entering in a direction of the driving lane and the vehicle traveling on the driving lane.

In this case, even in a section where the lanes join, successive cut-ins ahead of the vehicle (S610) may cause congestion of following vehicles traveling behind the vehicle on the driving lane, and thus the cut-in allowance determining step S400 may disallow the lane change for a successive cut-in attempt by a subsequent neighboring vehicle after the lane change is allowed for one neighboring vehicle (S612).

In this way, the cut-in allowance determining step S400 may identify various cut-in situations using the situation information and the lane information obtained by the sensor and the camera and may then determine whether to allow a cut-in ahead of the vehicle within a range that does not impede a traffic flow.

In addition, in response to a determination to allow a lane change made in front of the vehicle, the cut-in response controlling step S500 may perform the deceleration control on the vehicle to widen a gap with a preceding vehicle in order to provide a space for a neighboring vehicle to cut in (S611).

In this case, the cut-in response controlling step S500 may perform the deceleration control to induce a stable lane change of the neighboring vehicle and maintain a state in which the gap with the preceding vehicle remains longer than the length of the neighboring vehicle in consideration of a gap between the vehicles after the neighboring vehicle cuts in.

In addition, in response to a determination to disallow a lane change made in front of the vehicle, the cut-in response controlling step S500 may perform the acceleration control on the vehicle to narrow the gap with the preceding vehicle in order not to provide a space for the neighboring vehicle to cut in (S612).

In this case, the cut-in response controlling step S500 may control the vehicle to accelerate or decelerate such that the gap between the vehicle and the neighboring vehicle remains shorter than the length of the neighboring vehicle until the lane change intention of the neighboring vehicle disappears.

The present disclosure described above may be embodied as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a read-only memory (ROM), a random-access memory (RAM), a CD-ROM, a magnetic tape, a floppy disk, an optical data storage device, and the like.

Also, the driving lane recognizer, the neighboring vehicle detector, the lane change intention determiner, the cut-in allowance determiner, and the cut-in response controller may each or in an integrated form comprise a non-transitory computer-readable storage medium storing one or more instructions, e.g. one or more program codes for performing their functionalities described above and a processor (e.g., computer, microprocessor, CPU, ASIC, circuitry, logic circuits, etc.) which executes the one or more instructions.

Therefore, the foregoing detailed description should not be construed as restrictive but be considered illustrative in all respects. The scope of the present disclosure should be determined by a reasonable interpretation of the appended claims, and all modifications within the equivalent scope of the present disclosure are considered included in the scope of the present disclosure.

What is claimed is:

1. An apparatus for controlling a host vehicle, the apparatus comprising:
    a driving lane recognizer configured to determine whether a driving lane on which the host vehicle is traveling is congested or not;
    a neighboring vehicle detector configured to obtain vehicle information including a movement and a heading direction of at least one neighboring vehicle traveling on at least one neighboring lane;
    a lane change intention determiner configured to determine whether the at least one neighboring vehicle has an intention to cut in the driving lane based on the vehicle information;
    a cut-in allowance determiner configured to determine whether to allow a cut-in of the at least one neighboring vehicle; and a cut-in response controller configured to control the host vehicle to accelerate or decelerate according to a determination of the cut-in allowance determiner, wherein the cut-in allowance determiner is further configured to determine to disallow a cut-in of the at least one neighboring vehicle into a lane ahead of the host vehicle when a predetermined condition is satisfied, and wherein the predetermined condition includes that deceleration or stop control for the host vehicle occurs in a preset number of times due to one or more other vehicle cutting in ahead of a preceding vehicle traveling in front of the host vehicle.

2. The apparatus of claim 1, wherein the lane change intention determiner is further configured to determine a target vehicle among the at least one neighboring vehicle based on positions of the at least one neighboring vehicle, and determine whether the target vehicle has an intention to cut in the driving lane based on a position change and a heading direction of the target vehicle.

3. The apparatus of claim 2, wherein the lane change intention determiner is further configured to determine whether the target vehicle has the intention when at least one tire of the target vehicle steps on or crosses a line of the driving lane while a lateral distance between the line and the target vehicle becoming gradually shorter and the heading direction of the target vehicle being inclined toward the line.

4. The apparatus of claim 1, wherein the predetermined condition includes a case where the at least one neighboring vehicle fails to cut in due to a preceding vehicle traveling in front of the host vehicle in a preset number of times.

5. The apparatus of claim 1, wherein the predetermined condition includes a case where a traffic flow of the at least one neighboring lane is smoother than a traffic flow of the driving lane.

6. The apparatus of claim 1, wherein the predetermined condition includes determining that the cut-in violates a traffic law.

7. The apparatus of claim 1, wherein the predetermined condition includes a case where, after allowing a lane change of one neighboring vehicle when the at least one neighboring lane joins the driving lane, another neighboring vehicle attempts a subsequent cut-in.

8. The apparatus of claim 1, wherein the cut-in response controller is further configured to control the host vehicle to decelerate to increase a gap with a preceding vehicle to provide a space for the cut-in in response to a determination of allowing the cut-in.

9. The apparatus of claim 1, wherein the cut-in response controller is further configured to control the host vehicle to accelerate to decrease a gap with a preceding vehicle not to provide a space for the cut-in in response to a determination of disallowing the cut-in.

10. A method of controlling a host vehicle, the method comprising:
a driving vehicle recognizing step of determining whether a driving lane on which the host vehicle is traveling is congested or not;
a neighboring vehicle detecting step of obtaining vehicle information including a movement and a heading direction of at least one neighboring vehicle traveling on at least one neighboring lane;
a lane change intention determining step of determining whether the at least one neighboring vehicle has an intention to cut in the driving lane based on the vehicle information;

a cut-in allowance determining step of determining whether to allow a cut-in of the at least one neighboring vehicle; and
a cut-in response controlling step of controlling the host vehicle to accelerate or decelerate according to a determination of a cut-in allowance determiner,
wherein the cut-in allowance determining step comprises determining to disallow a cut-in of the at least one neighboring vehicle when a predetermined condition is satisfied, and
wherein the predetermined condition includes that deceleration or stop control for the host vehicle occurs in a preset number of times due to one or more other vehicle cutting in ahead of a preceding vehicle traveling in front of the host vehicle.

11. The method of claim 10, wherein the lane change intention determining step comprises determining a target vehicle among the at least one neighboring vehicle based on positions of the at least one neighboring vehicle, and determining whether the target vehicle has an intention to cut in the driving lane based on a position change and a heading direction of the target vehicle.

12. The method of claim 11, wherein the lane change intention determining step comprises determining whether the target vehicle has the intention when at least one tire of the target vehicle steps on or crosses a line of the driving lane while a lateral distance between the line and the target vehicle becoming gradually shorter and the heading direction of the target vehicle being inclined toward the line.

13. The method of claim 10, wherein the predetermined condition includes a case where the at least one neighboring vehicle fails to cut in due to a preceding vehicle traveling in front of the host vehicle in a preset number of times.

14. The method of claim 10, wherein the predetermined condition includes a case where a traffic flow of the at least one neighboring lane is smoother than a traffic flow of the driving lane.

15. The method of claim 10, wherein the predetermined condition includes determining that the cut-in violates a traffic law.

16. The method of claim 10, wherein the predetermined condition includes a case where, after allowing a lane change of one neighboring vehicle when the at least one neighboring lane joins the driving lane, another neighboring vehicle attempts a subsequent cut-in.

17. The method of claim 10, wherein the cut-in response controlling step comprises controlling the host vehicle to decelerate to increase a gap with a preceding vehicle to provide a space for the cut-in in response to a determination of allowing the cut-in.

18. The method of claim 10, wherein the cut-in response controlling step comprises controlling the host vehicle to accelerate to decrease a gap with a preceding vehicle not to provide a space for the cut-in in response to a determination of disallowing the cut-in.

19. An apparatus for controlling a host vehicle, the apparatus comprising:
a driving lane recognizer configured to determine whether a driving lane on which the host vehicle is traveling is congested or not;
a neighboring vehicle detector configured to obtain vehicle information including a movement and a heading direction of at least one neighboring vehicle traveling on at least one neighboring lane;

a lane change intention determiner configured to determine whether the at least one neighboring vehicle has an intention to cut in the driving lane based on the vehicle information;
a cut-in allowance determiner configured to determine whether to allow a cut-in of the at least one neighboring vehicle; and
a cut-in response controller configured to control the host vehicle to accelerate or decelerate according to a determination of the cut-in allowance determiner,
wherein the cut-in allowance determiner is further configured to determine to disallow a cut-in of the at least one neighboring vehicle when the at least one neighboring vehicle fails to cut in due to a preceding vehicle traveling in front of the host vehicle in a preset number of times.

* * * * *